United States Patent [19]

Noji et al.

[11] Patent Number: 4,994,970
[45] Date of Patent: Feb. 19, 1991

[54] WORKING ROBOT

[75] Inventors: Akio Noji; Toru Takeda; Makoto Imada; Kenji Kamimura, all of Saitama, Japan

[73] Assignee: Honda Giken Kogyo Kabushiki Kaisha, Tokyo, Japan

[21] Appl. No.: 383,496

[22] Filed: Jul. 24, 1989

[30] Foreign Application Priority Data

Aug. 16, 1988 [JP] Japan ................................ 63-202697

[51] Int. Cl.[5] ............................................ G05B 19/42
[52] U.S. Cl. .................................. 364/424.02; 901/1; 56/10.2; 180/169
[58] Field of Search ..................... 901/1, 14, 15, 47; 364/513, 424.02; 56/10.2; 180/167, 168, 169; 318/568.12

[56] References Cited

U.S. PATENT DOCUMENTS

| | | | |
|---|---|---|---|
| 3,924,389 | 12/1975 | Kita | 56/10.2 |
| 4,133,404 | 1/1979 | Griffin | 56/10.2 |
| 4,600,999 | 7/1986 | Ito et al. | 364/513 |
| 4,641,251 | 2/1987 | Inoue | 364/513 |
| 4,674,048 | 6/1987 | Okumura | 318/568.12 |
| 4,700,301 | 8/1987 | Dyke | 180/169 |
| 4,796,198 | 6/1989 | Boultinghouse et al. | 180/167 |
| 4,818,858 | 4/1989 | Sorimachi et al. | 901/1 |

Primary Examiner—Allen R. MacDonald
Assistant Examiner—George Davis
Attorney, Agent, or Firm—Pollock, VandeSande and Priddy

[57] ABSTRACT

A moving type working robot comprises a vehicle provided with a means for setting a traveling course between a position of stopping its working operation and an accumulating/replenishing place on the basis of positional information of the position where the working was stopped and the position of the place where the material loaded on the vehicle is to be accumulated/replenished. The positional information is stored in storing means and a control means is provided for traveling the vehicle from said accumulating/replenishing place to said position at which the working had been stopped, or vice versa, along said traveling course when the amount of the material loaded on the vehicle has reached a predetermined value.

5 Claims, 6 Drawing Sheets

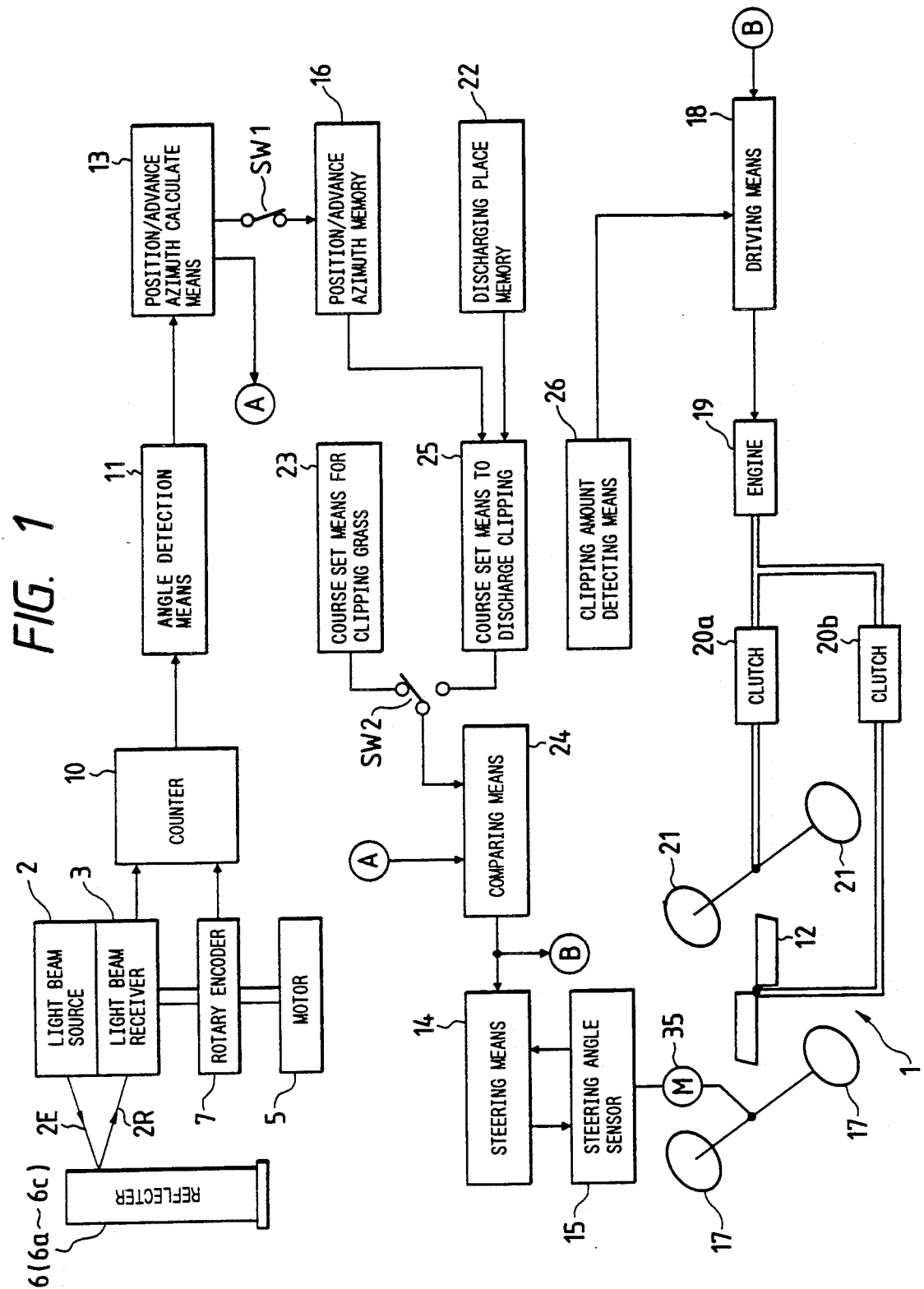

WORKING ROBOT

BACKGROUND OF THE INVENTION

1. Field of the Invention

This invention relates to a working robot, and particularly to a working robot which is so arranged that a predetermined work thereof is temporarily discontinued when an amount of the material contained or stored in a container thereon changes (increase or decrease) up to a predetermined value as a result of the expected work thereof, it runs to a predetermined place to dump the material accumulated in the container or replenish the material into the container, and it returns to the original working place where the working was discontinued to reopen the work thereof.

2. Description of the Prior Art

Recently, a moving type robot for automatically clipping the Korean lawn grass or other grass on a wide area such as a park, golf links and the like has been proposed, and an example thereof is the lawnmower robot disclosed in Japanese Patent Laid-open No. 62907/1985 and the specification of U.S. Pat. No. 3,924,389.

The aforesaid lawnmower robot is so arranged that markers disposed on the boundary of an area in which is planted the Korean lawn grass to be clipped are detected by a detector such as a magnetic sensor, an ultrasonic sensor or the like in the robot, and the robot is allowed to effect a U-turn action at the point at which a marker has been detected by the detector, whereby the robot is traveled within the predetermined area containing the lawn grass to be clipped and effects a lawn grass clipping operation. The grass clipped by the robot is accumulated in a storing section provided in the robot, the grass is then discharged at said U-turn point at a suitable time, and thereafter the grass discharged at several points are collected in a separate operation from that of the robot.

However, since the place where the grass clippings are discharged from the storing section in the robot is limited to the aforesaid U-turn points in the above described lawnmower robot, the grass clippings become scattered at plural points in the peripheral region around a grass clipping area so that there is such a problem of requiring a means for collecting the grass clippings in addition to the robot as well as troublesome operations.

In the case when it is intended to collectively discharge the grass clippings at a prescribed place for the sake of reducing such problems as described above, it is difficult to travel the above described conventional lawnmower robot to a predetermined place for discharging the grass clippings other than the places where markers have been placed and to return the robot to the original working position where the grass clipping operation has been temporarily interrupted, because an object which can be detected by the robot is limited to such markers disposed on the peripheral region around a grass clipping area.

Accordingly, there has been a problem of requiring a separate procedure such as use of a radio guidance system and the like by which a robot is guided to a place where grass clippings are to be discharged, and then the robot is returned again to the original position where the robot has discontinued the grass clipping operation, when it is intended to collectively discharge the grass clippings at a prescribed place.

SUMMARY OF THE INVENTION

An object of the present invention is to eliminate the above described problems of the prior art and to provide a moving type working robot provided with a means for detecting a self-position and an advance direction thereof with respect to at least three reference points disposed on the periphery of a working region and a first control means for controlling a traveling direction of the working robot on the basis of the detection information from said detecting means, and loaded with a material an amount of which changes with progress of a working, which comprises a detection means for detecting that an amount of the material loaded on the working robot changes as a result of the working up to a predetermined value; a means for stopping the working of said robot in response to an output detected from said detection means for material loaded: a means for storing a position at which the working is stopped and a traveling direction of said working robot with respect to said reference points at the time of stopping the working; a means for storing a position of the place where the material loaded on the working robot is to be accumulated/replenished with respect to said reference points; a means for setting a traveling course extending between a position of stopping the working and said accumulating/replenishing place on the basis of positional information of the position at which the working was stopped and of the place where the material loaded on the working robot was accumulated/replenished which has been stored in both said storing means; and a second control means for traveling said working robot from said position at which the working was stopped to the place where the material loaded on the working robot is to be accumulated/replenished along said traveling course.

The present invention is characterized in that a moving type working robot is provided with a third control means for traveling said working robot from said accumulating/replenishing place to said position at which the working had been stopped along said traveling course at the time when it is detected that an amount of the material loaded on the working robot has been restored up to an initial predetermined value, thereby to resume the working.

In the present invention having the above described construction, since detected information of a position and a traveling direction of a working robot with respect to the reference points at the time when an operation is discontinued as well as a place where a material is to be dumped or a necessary material is to be refilled with respect to the reference points can be stored, the working robot can be traveled along a course extending between the material accumulating or refilling place and the operation discontinued position on the basis of the information stored as well as the information detected in respect of the position and the traveling direction of the working robot with respect to the reference points.

A time when an operation of a robot is discontinued and a traveling course thereof is switched from a main course of the intended operation to a subsidiary course for treating a material contained or refilling new material which extends between an operation discontinued position and a contained material accumulating or new material refilling place is decided by detection of an amount of the material contained in a container, so that the operation can be discontinued any time after the amount of the material contained in the container reached a predetermined amount, whereby the material contained can be accumulated or necessary material can be deposited collectively on a predetermined place.

BRIEF DESCRIPTION OF THE DRAWINGS

FIG. 1 is a block diagram showing an example of the present invention;

DETAILED DESCRIPTION OF THE PREFERRED EMBODIMENTS

An embodiment of the present invention will be described hereinbelow by referring to the accompanying drawings. In the present embodiment, for example, an operation for clipping grass is carried out by means of the moving type working robot according to the present invention.

Figure 7:
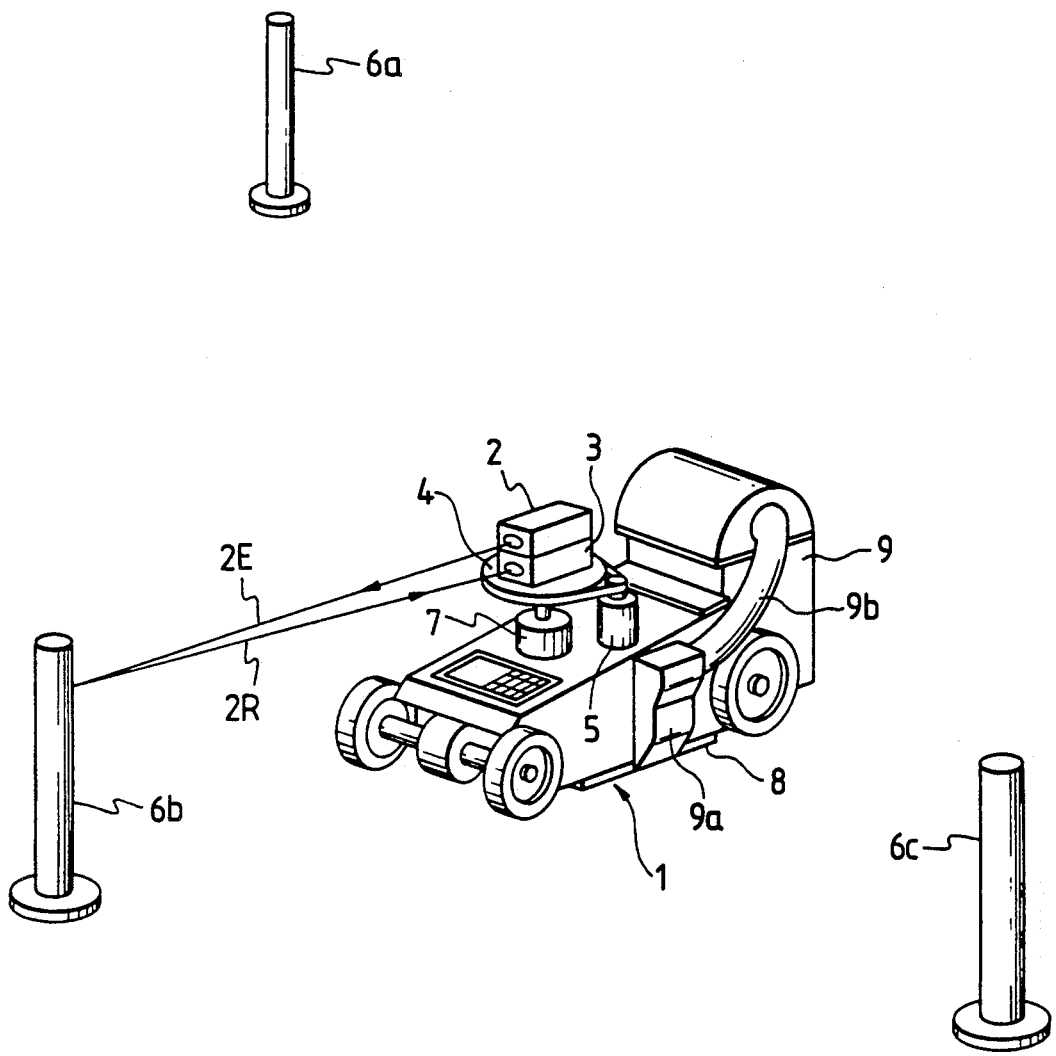
FIG. 7 is a perspective view showing outlines of a lawnmower robot and reflectors.

FIG. 7 is a perspective view showing a moving type lawnmower robot as well as an arrangement of beam reflectors disposed on a peripheral region where the robot effects a grass clipping operation.

In FIG. 7, the bottom of the moving lawnmower robot 1 (hereinafter referred to simply as "robot") is provided with a deck 8 involving a cutter blade (not shown). The grass clipped by the cutter blade is transferred to and stored in a container 9 through a suction box 9a and a chute 9b.

The robot 1 involves a well-known means for detecting an amount of the grass clippings stored in the container 9. As such well-known detecting means, for example, a means in which an amount of draft in the chute 9b is detected to compare said amount with a predetermined reference amount, whereby an amount of the grass clippings is indirectly determined may be used.

A rotating table 4 driven by a motor 5 is mounted on the upper part of the robot 1. The rotating table 4 mounts a beam source 2 for emitting a light beam 2E and a beam receiver 3 for receiving light 2A reflected from light beam 2E by each of the reflectors 6a-6c. The beam source 2 is provided with a light beam emitting means (light-emitting diode) and the beam receiver 3 is provided with a means for receiving incident light to convert it into an electrical signal (photo-diode) (both of them are not shown). A rotary encoder 7 is disposed so as to be interlocked with a drive shaft of the rotating table 4, so that when pulses output from the rotary encoder 7 are counted, a turning angle or an azimuth of the rotating table 4 can be detected.

Reflectors 6 for reflecting the light beam emitted from the beam source 2 in the incident direction thereof are disposed at three predetermined positions around a working region for the robot 1. The positions at which the three reflectors 6 have been disposed correspond to reference points for detecting a position and a travelling direction of the robot 1 as well as a place where grass clippings are to be discharged. The reflection surface on each of the reflectors 6 can compromise a so-called corner cube prism and the like which have heretofore been commercially available.

Next, the construction of a control system for controlling a position and a travelling direction of the robot according to the present embodiment will be described in conjunction with a block diagram shown in FIG. 1.

The light beam 2E emitted from the beam source 2 is scanned in a rotating direction of the rotating table 4 and the light beam 2E is reflected by one of the reflectors 6a-6c. The light beam 2R reflected by the one of the reflectors 6a-6c is introduced into the beam receiver 3 and detected as a signal which represents an azimuth of said one of the reflectors 6a-6c relative to a travelling direction of the robot 1.

In a counter 10, the number of pulses output from the rotary encoder 7 is counted in accordance with rotation of the rotating table 4. The value counted of the pulses is transferred to an angle detection means 11 whenever reflected light is received by the beam receiver 3. In the angle detection means 11, each angle defined between the adjoining two reflectors 6a-6c, respectively, viewed from the robot 1, i.e., differential azimuth is calculated on the basis of the counted value of the pulses transferred in every reception of the reflected light beam.

In a position/advance azimuth calculating means 13, the coordinates indicating a position of the robot 1 as well as an advance azimuth thereof are calculated on the basis of the detected results in the angle detector 11 and each distance between the respective reflectors 6, and the result of calculation is inputted to a comparing means 24 and a position/advance azimuth storing means 16, respectively. In the position/advance azimuth storing means 16, the result of the calculation in the position/advance azimuth calculating means 13 at the time when a SW 1 is opened is retained, and when the SW 1 is closed, the result of the calculation so retained is renewed with a fresh result calculated.

In a discharging place storing means 22, coordinates indicating positions of places where grass clippings to be discharged are accumulated with respect to the reflectors 6 are stored respectively.

To a means 25 for setting a course for discharging grass clippings are input first contents stored in the position/advance azimuth storing means 16 and second contents stored in the discharging place storing means 22, respectively, and a course for traveling the robot between the discharging place and a position where an operation of the robot 1 for clipping grass is discontinued is calculated and set.

A traveling course of the robot 1 for grass clipping operation has been set in a grass clipping course setting means 23.

In the comparing means 24, either data of the ones showing the traveling course set at the grass clipping course setting means 23 and the ones stored in the position/advance azimuth storing means 16 which has been selected by switching a SW 2 are compared with current values of the coordinates and the advance azimuth of the robot 1 obtained by the position/advance azimuth calculating means 13.

The comparative results in the comparing means 24 are supplied to a steering means 14 and a steering motor (M) 35 connected to front wheels 17 of the robot 1 is driven on the basis of the above-mentioned comparative results. An angle of steering for the front wheels 17 driven by the steering motor 35 is detected by means of a steering angle sensor 16 mounted on the front wheels of the robot 1, and the value detected is fed back to the steering means 14.

A driving means 18 controls starting and stopping of an engine 19 as well as operation of a clutch 20 for transmitting the power of the engine 19 to rear wheels 21. Furthermore, the engine 19 is connected to the cutter blade 12 for clipping grass through a clutch 20b, and the engine driving means 18 controls also the clutch 20b.

To the engine driving means 18 are inputted the detection result of the means 26 for detecting the amount of clipping grass and the comparative result of the comparing means 24, and a control command is output to the engine 19 and clutches 20a and 20b in accordance with the signals 10 applied thereto.

The means 26 for detecting the amount of clipping grass detects when the grass clippings accumulated in the container 9 has reached a predetermined amount. When it is detected that an amount of grass clippings is over a predetermined upper limit by means of the clipping grass amount detecting means 26, the SW 1 is opened, and the SW 2 is switched to the side of a means 25 for setting a travelling course for discharging grass clippings. At the same time, the clutch 20b actuates to stop the driving of the cutter blade 12.

On one hand, when the first fact that the grass clippings were discharged at a predetermined place and the amount of grass clippings in the container 9 became a predetermined lower limit or less is detected by means of the clipping grass amount detecting means 26, and the second fact that the robot 1 has returned to the original position thereof at the time when the upper limit of the above described grass clipping amount was detected is detected by means of the comparing means 24, the SW 1 is closed and the SW 2 is returned to the side of the means 23 for setting a grass clipping course. At the same time, the clutch 20b is engaged to drive the cutter blade 12 so that the grass clipping operation is resumed.

A fundamental principle for detecting a position and advance azimuth of the robot 1 will be described hereinbelow in accordance with the present embodiment having the above described construction. The details of such fundamental principle for detection is described in the specifications of the Japanese Patent Application Nos. 116689/1988 (U.S. Appln. Ser. No. 344,574) and 149619/1988 (U.S. Appln. Ser. No. 362,630).

Figure 3:
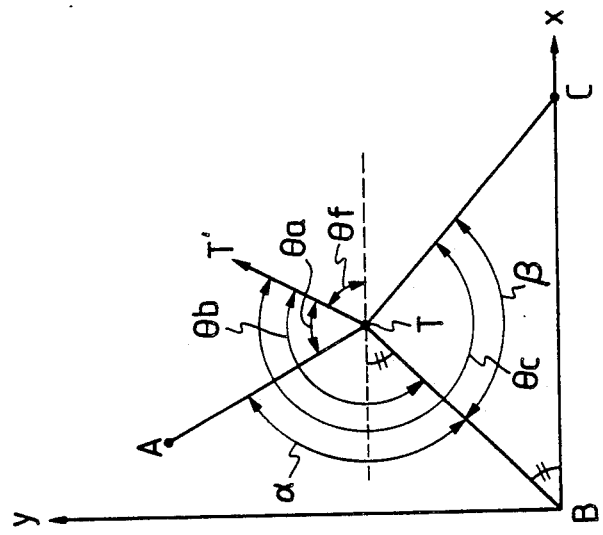
FIG. 3 is a diagram for explaining a principle of detecting an advance azimuth of a lawnmower robot.
Figure 2:
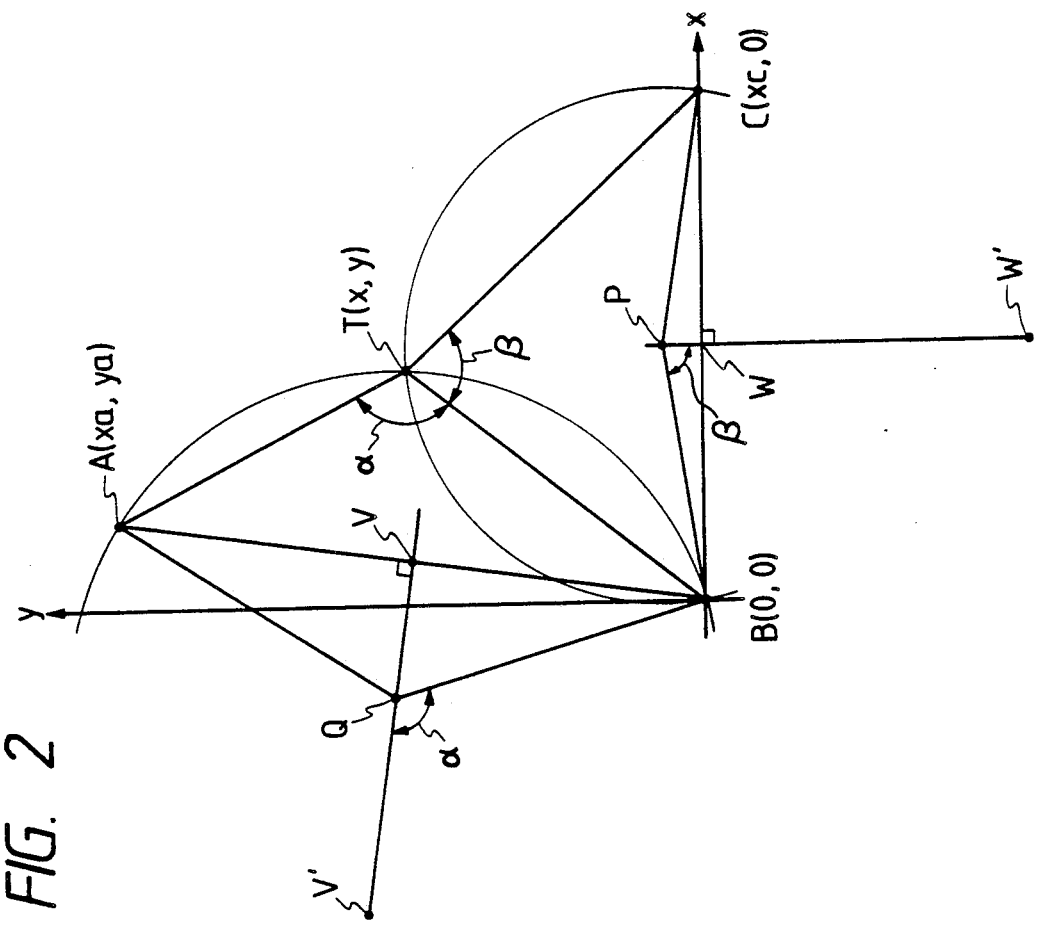
FIG. 2 is a diagram for explaining a principle of detecting a self-position of a lawnmower robot.

In FIGS. 2 and 3, the positions A, B and C (hereinafter referred to as "reference points") of the reflectors 6a-6c and the position T of the robot 1 are respectively shown in a coordinate system for indicating a working area of the robot 1. In the same Figures, the reference points A, B and C of the reflectors 6a-6c disposed at three different positions as well as a position T of the robot are represented by an x-y coordinate system in which the reference point B is the origin and a line extending between the reference points B and C is the x-axis.

As is apparent from FIG. 2, the position T of the robot present on a first circumscribed circle Q for a triangle ATB as well as a second circumscribed circle P for a triangle BTC. Accordingly, when two points of intersection of the circumscribed circles Q and P for the triangles ATB and BTC are calculated, the position of the robot 1 is fixed. In this case, since the reflector 6b is the origin the other intersection T of the circumscribed circles P and Q is calculated in accordance with the following procedure so that a position of the robot 1 is found.

First, if the center of the circumscribed circle P for the triangle BTC is represented by P, the center P resides on a perpendicular bisector of a segment of the line BC, and it gives the following equation, $$<BPW'=\beta$$

where W' is a point on the perpendicular bisector of the segment BC and which resides on the side opposite to the point T with respect to the straight line BC and is sufficiently apart from the straight line, from a relationship between the central angle and the angle of circumference $\beta$.

Observing a triangle BPW (W is midpoint of the segment BC), coordinates of the center of the circle P and a radius thereof are $\{xc/2, (xc/2) \cot \beta\}$ and $\oplus xc/(2 \sin \beta)|$, respectively. Hence, the circumscribed circle P is represented by the following equation.

$$(x-xc/2)^2+\{y-(xc/2)\cot\beta\}^2=\{xc/(2\sin\beta)\}^2$$

When the equation is rearranged, the following equation (1) is obtained.

$$x^2-xc.x+y^2xc.y.\cot\beta=0 \quad (1)$$

When the center of the circumscribed circle Q for the triangle ATB is fixed as Q, the center Q resides on a perpendicular bisector of a segment of the line AB, and it gives the following equation, $$<BQV'=\alpha$$

where V' is a point on the perpendicular bisector of the segment AB and which resides on the side opposite to the point T with respect to the straight line AB and is sufficiently apart from the straight line.

Observing a triangle BQV (V is the midpoint of the segment AB), coordinates of the center of the circle Q and a radius thereof are $\{xa/2+(ya/2)\cot\alpha, ya/2-(xa/2)\cot\alpha\}$ and $$|\sqrt{xa^2+ya^2}/(2\sin\alpha)|,$$

respectively. Hence, the circumscribed circle Q is represented by the following equation (2).

$$x^2-x(xa+ya.\cot\alpha)+y^2-y(ya-xa.\cot\alpha)=0 \quad (2)$$

From the above equations (1) and (2), coordinates (x, y) of the point T are calculated from the following equations (3) and (4).

$$x=xc(1+k.\cot\beta)/(1+k^2) \quad (3)$$
$$y=kx \quad (4)$$

where k is represented by an equation (5):

$$k=(xc-xa-ya.\cot\alpha)/(ya-xa.\cot\alpha-xc.\cot\beta) \quad (5)$$

and which indicates an inclination of a straight line BT.

Furthermore, an advance direction of the robot 1 is calculated as follows. In FIG. 3, assuming that an angle defined by the advance direction TT' of the robot 1 and x-axis is $\theta f$, and angles of rotation or differential azimuths defined by the respective reflectors 6a, 6b and 6c (points A, B and C, respectively) with respect to the advance direction as reference are $\theta a$, $\theta b$ and $\theta c$, since the inclination of the segment BT is k, it gives the following equation, $$\theta f = 180° - (\theta b - \tan^{-1} k) \qquad (6)$$

The calculation of positional information in accordance with the procedure described above is carried out in the position/advance azimuth calculating means 13.

Figure 4:
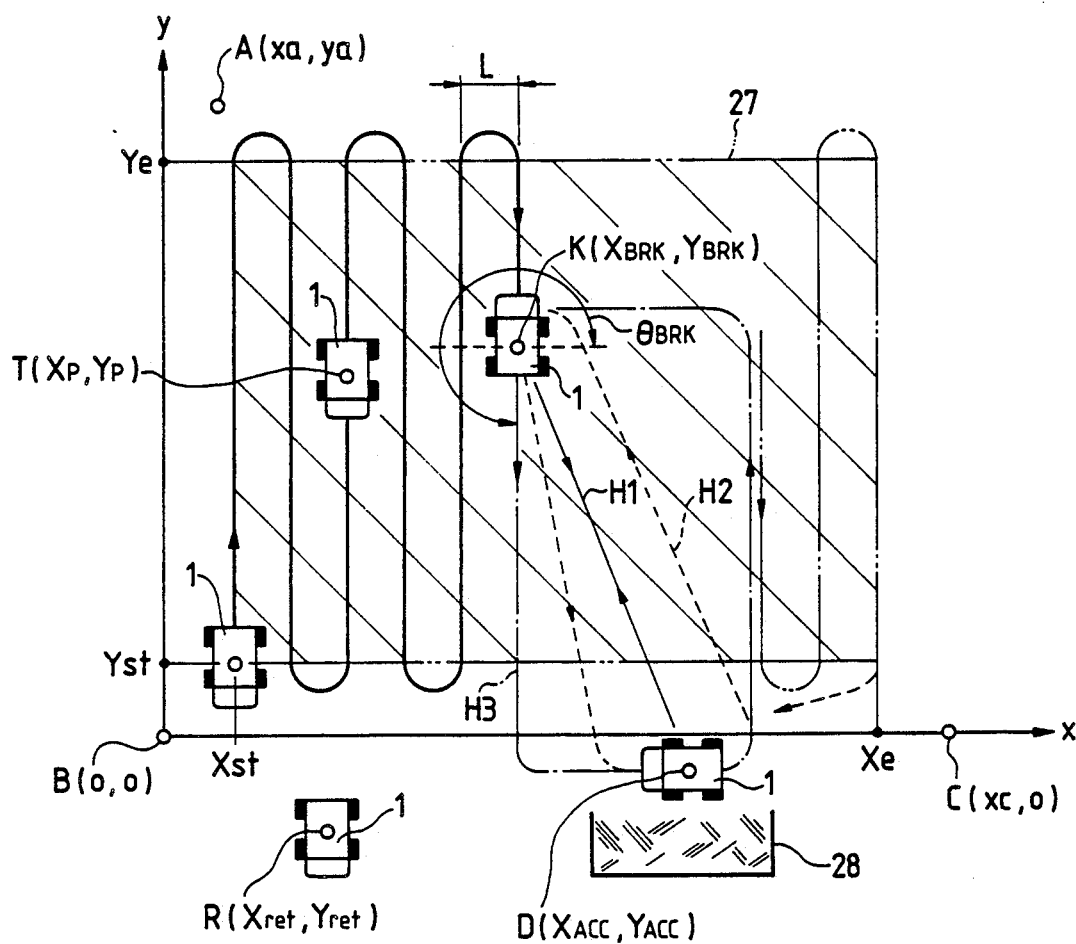
FIG. 4 is a diagram showing a state of arrangement of a traveling course of a lawnmower robot and reference points.
Figure 5:
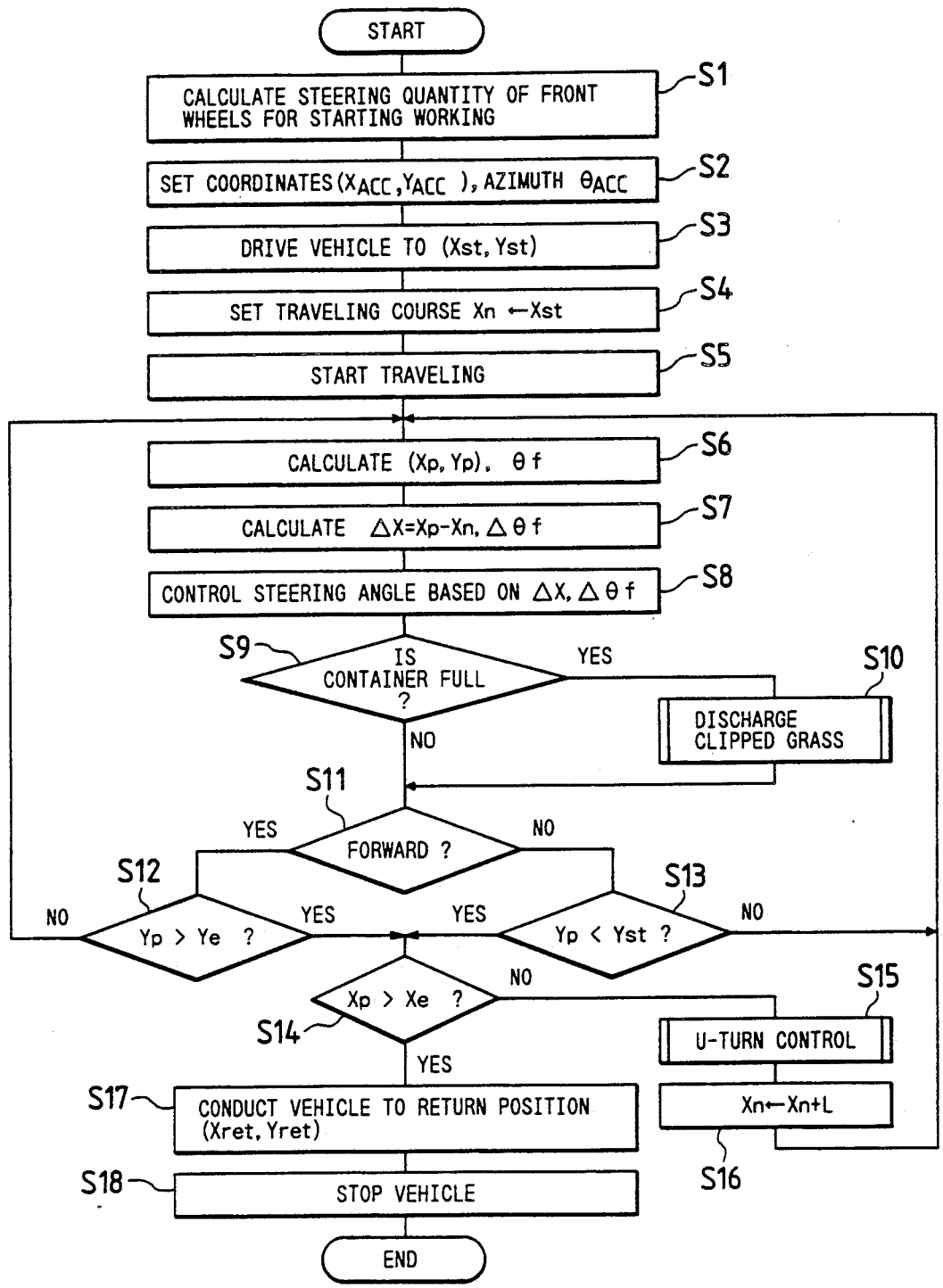
FIG. 5 is a flowchart for steering controls.

Next, steering control for the robot 1 based on positional information of the robot 1 calculated in accordance with the above procedure will be described hereinbelow. FIG. 4 is a schematic diagram showing a state of arrangement in respect of a traveling course of the robot 1 and reflectors 6, and FIG. 5 is a flowchart illustrating a procedure for steering control.

In FIG. 4, a position and a working area 27 of the robot 1 are represented by a coordinate system wherein the point B is fixed as the origin, and a straight line extending between the points B and C is defined as the x-axis. (Xret, Yret) indicate coordinates of a returning position R of the robot 1, and the working area 27 is a quadrilateral region including four apexes of the points represented by four coordinates (Xst, Yst), (Xst, Ye), (Xe, Yst) and (Xe, Ye). In this case, the current position of the robot 1 is represented by T(Xp, Yp).

A position K of the robot 1 at the time when such fact that grass clippings have become full in the container 9 is detected by the grass clipping amount detecting means 26 is represented by $X_{BRK}$, $Y_{BRK}$), and an angle (advance azimuth) formed by the advance direction of the robot 1 with respect to x-axis is represented by $\theta_{BRK}$.

A point D of stopping position of the robot 1 which had been predetermined in a stage prior to the place 28 for discharging grass clippings is represented by ($X_{ACC}$, $Y_{ACC}$), and the advance azimuth of the robot 1 at the point D is $\theta_{ACC}$ (in the present embodiment, since the advance direction is parallel to the x-axis, the advance azimuth $\theta_{ACC}$ is not shown).

For simplicity an example wherein the four sides of the working area 27 are parallel to x- or y-axes is shown in FIG. 4, but another direction and/or shape of the working area may be selected so far as the points A-C are disposed around the working area 27.

In accordance with the flowchart shown in FIG. 5, a control procedure will be described hereinbelow in which it is assumed that the robot 1 reciprocates in parallel to the y-axis as in the traveling locus of FIG. 4, and the pitch therefor is L.

At the beginning of the grass clipping work, the switch SW1 is closed and the switch SW2 is connected to the side of the means 23 for setting a grass clipping course, since the grass container 9 is not full.

In a step S1, a steering amount of the front wheels 17 of the robot 1 is calculated in the steering means 14 on the basis of both coordinates of the current position (Xret, Yret) of the robot 1 obtained in the position/advance direction operating means 13 and of a working start position (Xst, Yst) set in the traveling course setting means 16.

In a step S2, the coordinates ($X_{ACC}$, $Y_{ACC}$) of the point D which had been predetermined in front of the place 28 for discharging grass clippings and a desirable advance azimuth $\theta_{ACC}$ of the robot 1 at the point D (a direction suitable for discharging grass clippings) are set at the discharging place storing means 22.

In a step S3, the motor 35 is driven by means of the steering means 14 to steer the front wheels 17 along the direction determined in the step S1 by the aforesaid steering amount, and the engine is started by the driving means 18. Then, the clutch is engaged to drive the robot 1 and it is positioned at the working start position (Xst, Yst).

In a step S4, Xst is set as the X-coordinates of the traveling course Xn so that the traveling course is decided.

In a step S5, the clutch 20b is engaged to drive the cutter blade 12 and the travel of the robot 1 is commenced.

In a step S6, the present position (Xp, Yp) and an advance direction $\theta f$ of the robot 1 are calculated.

In a step S7, a deviation amount of the traveling course ($\Delta X = Xp - Xn$, $\Delta \theta f$) is operated, and a steering angle is controlled in a step S8 by the steering means 14 in response to the amount of deviation calculated in the step S7.

Figure 6:
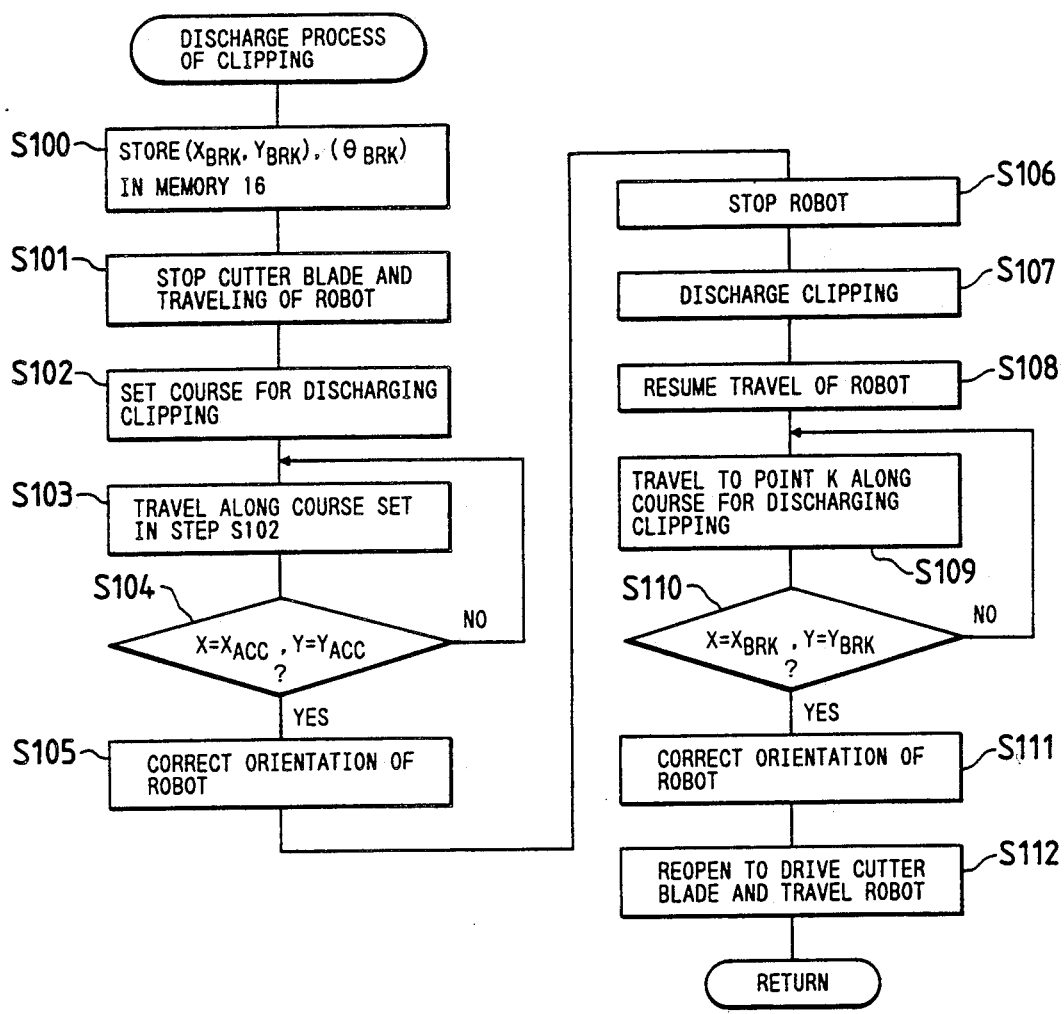
FIG. 6 is a flowchart for a treatment of discharging grass clippings.

In a step S9, it is judged whether the container 9 becomes full or not on the basis of a detection signal from the grass clipping amount detecting means 26. If the container 9 is full, the processing transfers to a step S10 and a treatment for discharging grass clippings which will be described hereinbelow in conjunction with FIG. 6 is effected. In the case where the container 9 is not full, the processing proceeds to a step S11.

In a step S11, it is judged that either the robot 1 travels towards the direction going away from the origin (forward direction) or the direction approaching the origin (reverse direction) in the y-axial direction.

In case of forward direction, it is judged whether one stroke is finished (Yp > Ye) or not in a step S12, while in case of reverse direction, it is judged whether one stroke is finished (Yp < Yst) or not in a step S13. When it is judged that such one stroke is not finished in either the step S12 or the step S13, processings in the steps S6–S11 are repeated.

In case where it is judged that such one stroke is finished in either the step S12 or S13, it is judged in the following the step S14 whether all of the strokes are finished (Xp > Xe) or not.

When all of the strokes are not finished, the procedure shifts from the step S14 to the step S15 to effect U-turn control of the robot 1. A U-turn control is effected in a different manner from a steering control in a straight-line course which is carried out by the processings of the steps S6–S8 in which the positional information of the robot 1 calculated in the position/advance azimuth calculating means 13 is fed back to the steering means 14.

In other words, in a turning course, a steering angle of the robot 1 is fixed to such an angle which has been previously set. It is arranged that the robot stops the turning thereof at the time when azimuth angles of the respective reference points A, B and C viewed from the robot 1 which are calculated based on the differential azimuth detected by the angle detecting means 11 coincide with a value within a range of a predetermined angle, and then the robot returns to a state of the steering control in the straight-line course which is effected in accordance with the steps S6–S8. Such U-turn control is described in detail in the specification of the aforementioned Japanese Patent Application No. 149616/1988 (U.S. Appln. Ser. No. 362,630).

In a step S16, a pitch L is added to Xn thereby operating (Xn + L) and as a result, the following traveling course is set. When the following traveling course is set, the procedure returns to the step S6 and the above described processings are repeated.

When all of the strokes have been, the robot 1 returns to the return position (Xret, Yret) in a step S17, and the travel thereof stops in a step S18.

Next, controls for the grass clipping processing will be described hereunder. FIG. 6 is a flowchart showing the grass clipping processing wherein when the container 9 is detected to be full by the grass clipping amount detecting means 26, the SW 1 is opened to maintain the data indicating the position (point K in FIG. 4) and the advance azimuth of the robot 1 at that time in the position/advance azimuth storing means 16 (step S100). Concurrently, the SW 2 is switched to the side of the means 25 for setting a grass clipping discharging course.

In a step S101, a signal from the grass clipping amount detecting means 26 is transferred to the engine driving means 18, and the means 18 disengages the clutch 20b in response to the signal to stop the driving of the cutter blade 12. At the same time of stopping the cutter blade, traveling of the robot is stopped too.

In a step S102, a course for carrying grass clippings to the discharging place 28 and returning to the point K is calculated on the basis of positional information on point K maintained in the position/advance azimuth storing means 16 and positional information on point D stored in the discharging place storing means 22. This course can be determined as shown in FIG. 4 by a solid line H1 or dotted lines H2 and H3.

In a step S103, the robot 1 is traveled along the course set in the step S102. In this case, the robot 1 is controlled by the steering means 14 in such a manner that a dislocation of the robot 1 at the current position calculated by the position/advance azimuth calculating means 13 is corrected with respect to the course set in the means 25 for setting the grass clipping discharging course.

In a step S104, it is judged whether the X- and Y-coordinates of the robot 1 calculated in the position/advance azimuth calculating means 13 respectively coincide with $X_{ACC}$ and $Y_{ACC}$.

If the judgment in the step S104 is "yes", it is judged that the robot 1 has reached the point D in FIG. 4, and the robot proceeds to a step S105.

In the step S105, the direction of the robot 1 is corrected so as to coincide with $\theta_{ACC}$.

The clutch 20a is disengaged to stop the robot 1 in a step S106.

Grass clippings are discharged from the container 9 to the discharging place 28 in a step S107. As a means for discharging grass clippings from the container 9, either an automatically operative discharging means such as one for turning over the container 9 or one for opening a side wall of the container 9 and the like, or a manual means may be used.

In a step S108, when it is detected that grass clippings are discharged until they reach the lower limit of a predetermined amount or less, the clutch 20a is engaged again and the robot 1 starts the travel thereof.

In a step S109, the robot travels towards the position (point K) where the working was discontinued while tracing inversely the course for discharging grass clippings. It is possible for the robot 1 to return along an optional different course.

It is judged whether the X- and Y-coordinates of the robot 1 calculated in the position/advance azimuth calculating means 13 coincide with $X_{BRK}$ and $Y_{BRK}$, respectively, in a step S110. If the X-and Y-coordinates coincide with the calculated values, respectively, the processing proceeds to a step S111 and the direction of the robot 1 is ?corrected so as to coincide with $\theta_{BRK}$. If the judgment in the step S110 is "no", the processing returns to the step S109.

In a step S112, the clutch 20b is engaged to drive the cutter blade 12 so that grass clipping operation is resumed.

As described above, in the present embodiment, it is arranged that a position for stopping the grass clipping operation as well as a place for discharging grass clippings are calculated as relative positions with respect to the reference points A, B and C, and the results can be stored. Accordingly, a traveling course extending between the position for stoppage and the discharging place can be easily calculated so that the robot 1 can be allowed to travel along the calculated traveling course.

In the case where the robot has a four-wheel steering construction, since the robot 1 can turn around substantially the central portion thereof as the axis, a course H1 may be set for discharging grass clippings, extending linearly between the point K and the point D as shown in FIG. 4. On the other hand, in the case where the robot has only a front wheel or rear wheel steering construction, a course H2 may be set for discharging grass clippings in which turning circles of rotation are disposed in the vicinities of the points K and D into consideration a turning curvature of the robot 1. Furthermore, as a course for discharging grass clippings, a further different course as designated by reference character H3 is available. In particular, the robot is allowed to proceed rectilinearly in the direction of the Y-axis while maintaining $X = X_{BRK}$, and then to proceed in the direction of X-axis so that $Y = Y_{ACC}$ is kept till the X-coordinates of the current position becomes $X_{ACC}$ when the Y-coordinates of the current position approaches the vicinity of $Y_{ACC}$ and hence, a tetragonal locus is drawn as a whole. As a result, a smooth movement of the robot for the discharging operation can be effected along the moving route for the grass clipping working.

Moreover, the grass clipping amount detecting means 26 is not limited to a means for indirectly detecting the amount of grass clippings by detecting an amount of draft in the chute 9b as mentioned above, and any one of or a plurality of detection means such as means for detecting the height of the grass clippings accumulated in the container 9, or for detecting a period of time for grass clipping operation, or for detecting a travel distance of the robot, and the like means may, of course, be used.

While the present embodiment has been described in connection with a grass clipping robot, the working robot according to the present invention, as a matter of course, is applicable for not only an operation for clipping wild grass other than the Korean lawn grass, but also various automated operations such as water spray, fertilizer application, sprinkling of an insecticide and the like. Of course, in case of operations such as water spray, fertilizer application, sprinkling of an insecticide and the like, since water, fertilizers, chemicals and the like which have been previously loaded on a robot decrease with the progress of such operations, the operation cannot be continued after such materials were exhausted. Accordingly, the robot discontinues the operation at the time when it is detected that the material which had been loaded on the robot decreases to a predetermined amount or less, stores the coordinates at the point of discontinuation, and then the robot is allowed to transfer to a predetermined replenishing spot to replenish the material to be loaded. Thereafter, the robot is allowed to return to the point of discontinued operation and then, the operation is resumed. In this case, it will be easily understood that the same steps for controlling the robot can be made as those mentioned above other than only a factor for judgment in case of the discontinuation of operations.

As is apparent from the above description, the following advantages can be attained in accordance with the present invention.

(1) At any time when the contents in a container increase or decrease up to a predetermined amount, it is possible to discontinue an operation and to discharge or replenish the contents in the container.

(2) A position at which an operation is discontinued is stored, and a robot returns to the position at which the operation has been discontinued and resumes the operation after discharging or replenishing the contents to be discarded or replenished. Thus, there is no unfinished working such as half-done clipping of grass and the like.

(3) The contents to be discarded can be intensively collected in a predetermined discharging place so that the contents are not scattered. Hence, such treatment for transferring the contents to the other places after completing the operation or the like treatment can be easily made. The material to be replenished can be deposited at a predetermined spot.

What is claimed is:

1. A moving type working robot comprising a vehicle that moves within a working region defined by at least three reference points disposed adjacent a periphery of said working region, said vehicle having first detecting means for detecting a position of said vehicle relative to said reference points, said first detecting means including means for detecting an advance direction of said vehicle with respect to said reference points, first control means on said vehicle for controlling a travelling direction of said vehicle on a basis of information from said first detecting means, said vehicle being operative to perform a predetermined working operation as it moves within said working region and being loaded with a material whose amount changes with progress of said predetermined working operation, second detecting means on said vehicle for detecting the amount of said material loaded on said vehicle, said second detecting means being operative to provide an output which indicates that the amount of said material loaded on said vehicle has changed to a predetermined value, means for stopping the working operation of said vehicle in response to said output from said second detecting means during said working operation, memory means for storing the position and the travelling direction of said vehicle with respect to said reference points when said working operation is stopped, means for storing the position of an accumulating/replenishing place where the material loaded on said vehicle is to be accumulated or replenished, means for setting a travelling course extending between the position at which the working operation was stopped and the position of said accumulating/replenishing place, and second control means on said vehicle for travelling said vehicle along said travelling course from said position at which the working operation was stopped to said accumulating/replenishing place where the material loaded on the vehicle is to be accumulated or replenished.

2. A moving type working robot as claimed in claim 1 including third control means on said vehicle for travelling said vehicle along a return path from said accumulating/replenishing place to said position at which the working operation had been stopped in response to an output from said second detecting means indicating that the amount of said material loaded on the vehicle has been restored to an initial predetermined value.

3. A moving type working robot as claimed in claim 2 including means on said vehicle responsive to information provided by said first detecting means and information stored in said memory means for resuming said working operation when said vehicle has reached a position along said return path corresponding to the position at which the working operation was stopped.

4. A moving type working robot as claimed in claim 1 wherein the material loaded on said vehicle increases in amount with progress of said working operation, said means for stopping said working operation being responsive to an output of said second detecting means indicating that the amount of said material loaded on the vehicle exceeds a predetermined value.

5. A moving type working robot as claimed in claim 1 wherein the material loaded on said vehicle decreases in amount with progress of said working operation, said means for stopping said working operation being responsive to an output from said second detecting means indicating that the amount of said material loaded on said vehicle has decreased to at least at a predetermined value.

* * * * *